United States Patent
Berkobin

(10) Patent No.: US 10,102,174 B2
(45) Date of Patent: Oct. 16, 2018

(54) SMART HARNESS

(71) Applicant: Verizon Patent and Licensing Inc., Arlington, VA (US)

(72) Inventor: Alex D. Berkobin, Atlanta, GA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 337 days.

(21) Appl. No.: 14/505,597

(22) Filed: Oct. 3, 2014

(65) Prior Publication Data

US 2016/0098369 A1  Apr. 7, 2016

(51) Int. Cl.
*G06F 13/36* (2006.01)
*G06F 13/40* (2006.01)
*G06F 13/42* (2006.01)

(52) U.S. Cl.
CPC ...... *G06F 13/4068* (2013.01); *G06F 13/4208* (2013.01)

(58) Field of Classification Search
CPC .......... G06F 13/4208; G06F 13/4068
USPC ....................................... 710/308
See application file for complete search history.

(56) References Cited

U.S. PATENT DOCUMENTS

| | | | | |
|---|---|---|---|---|
| 8,804,538 B1* | 8/2014 | Higgins | .................... | H04J 3/14 315/294 |
| 2008/0240148 A1* | 10/2008 | Taub | ....................... | H04W 4/90 370/462 |
| 2010/0169573 A1* | 7/2010 | Tsuji | ..................... | G06F 3/0611 711/114 |
| 2011/0170552 A1* | 7/2011 | Suzuki | ................ | H04L 49/9078 370/401 |
| 2013/0268156 A1* | 10/2013 | Schumann | ............. | G07C 5/085 701/31.4 |

(Continued)

FOREIGN PATENT DOCUMENTS

KR   20080081681 A  *  9/2008

OTHER PUBLICATIONS https://en.wikipedia.org/w/index.php?title=On-board_diagnostics&oldid=617966490#ISO_standards, Jul. 22, 2014.*

(Continued)

*Primary Examiner* — Chun Kuan Lee

(57) ABSTRACT

A smart harness may comprise a connector configured to selectively plug into and be removable from an Electronic Control Unit ("ECU") of a vehicle, a first On-Board Diagnostics device ("first OBD device"), and a second On-Board Diagnostics device ("second OBD device"). The smart harness may further comprise at least one transceiver configured to receive and send diagnostic information between the ECU and the first OBD device and the second OBD device. The smart harness may further comprise a processor and a memory having a program communicatively connected to the processor. The processor may be configured to receive a request from at least one of the first and second OBD devices, prioritize the request based on a predefined priority associated with at least one of the first and second OBD devices, record at least a portion of the request as part of a distribution record, send the request to the ECU, receive a response from the ECU, compare the response with the distribution record, and send the response to at least one of the first and second OBD devices based on the distribution record.

20 Claims, 3 Drawing Sheets

(56) References Cited

U.S. PATENT DOCUMENTS

2014/0129740 A1* 5/2014 Wang .................... G06F 13/385
                                                                                              710/15

OTHER PUBLICATIONS http://www.lbcc.edu/attc/documents/OBD2.pdf, 1998.*
Machine translation of KR-20080081681-A, Sep. 10, 2008, whole document (Year: 2008).*

* cited by examiner

SMART HARNESS

BACKGROUND

Traditional aftermarket On-Board Diagnostics devices ("OBD devices") may be used to obtain data from an Electronic Control Unit ("ECU") of a vehicle that is not displayed by the vehicle. Typical OBD devices plug into an existing On-Board Diagnostics connector ("OBD connector") of the vehicle that is typically found under a dashboard of a vehicle. Due to the increasing popularity of OBD devices, a user may desire to connect two or more OBD devices to the vehicle. However, typically only one OBD connector is provided as part of the vehicle.

To accomplish the physical connection of two OBD devices, a traditional splitter may be utilized that includes one male On-Board Diagnostics connector ("OBD connector") that is simply spliced to two female OBD connectors. The male OBD connector plugs into an Electronic Control Unit connector ("ECU connector") in communication with the ECU while the two female OBD connectors receive the OBD devices. However, the traditional splitter merely physically connects the OBD devices to the ECU but lacks the ability to track and route data between the OBD devices and the ECU. As a result, connecting two OBD devices to the ECU using the traditional splitter typically results in errors and data loss while data is being collected from the ECU.

Using the traditional splitter, OBD devices may send a request directly to an Electronic Control Unit gateway ("ECU gateway") of the ECU. The ECU gateway sends the request to and receives a response from the ECU while the ECU balances processing demands from the vehicle. However, traditional splitters have no ability to track the requests or route the responses, which typically causes the ECU gateway to take more time to process the requests than traditional OBD devices are configured to wait for the response. By the time the ECU gateway sends the request to the ECU, receives the response from the ECU, and sends the response to the OBD devices, each of the OBD devices may have stopped waiting and moved on to its next request. Furthermore, if two OBD devices each send a request to the ECU gateway for different data in quick succession, the responses from the ECU may be unpredictably received by both, one, or neither of the two connected telematics devices, regardless of which of the OBD devices sent the request. Additionally, if a traditional OBD device, while waiting for a requested response, receives an unrelated response associated with another OBD device, this may cause an error in the OBD device or at least cause the OBD device to stop waiting for the requested response. Thus, traditional splitters lack the ability to route responses from the ECU based on the OBD device that sent the request.

There is a need for a smart harness configured to releasably plug into an existing ECU connector of a vehicle and selectively coordinate requests from two or more aftermarket OBD devices with the respective responses from the ECU. It may be desirable for the smart harness to provide power to the two OBD devices from the ECU connector. It may be desirable to provide a smart harness that may be configured to record and route requests and responses between the aftermarket OBD devices and the ECU. The smart harness may be utilized with two or more types of aftermarket OBD devices, such as a telematics device and a diagnostic code reader.

DETAILED DESCRIPTION

Figure 1:
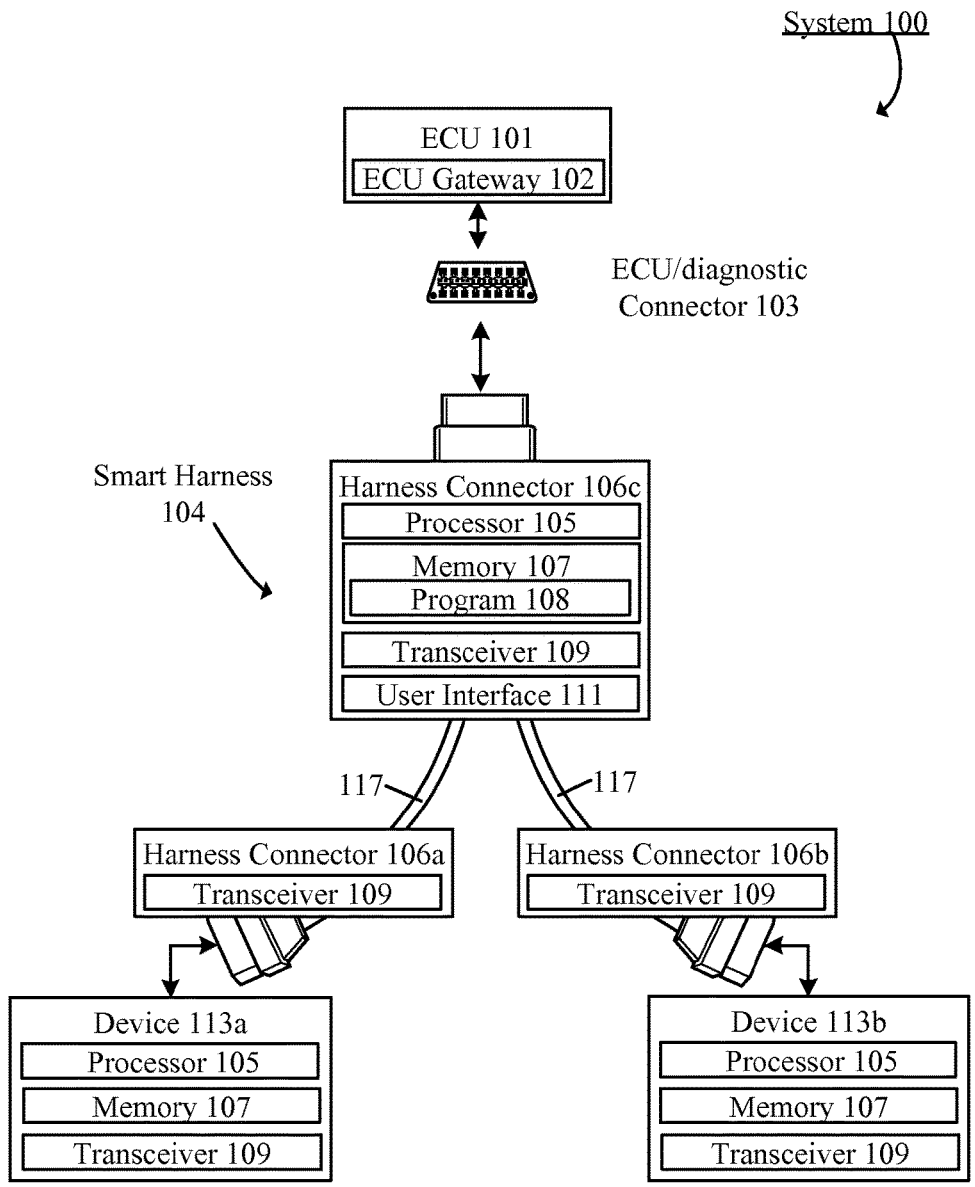
FIG. 1 illustrates an exemplary system of the present disclosure.

A smart harness may be configured to releasably connect any number of aftermarket OBD devices to an ECU connector of the vehicle. The smart harness may provide power from the ECU connector to the OBD devices. The smart harness may coordinate requests from the OBD devices with respective responses from the ECU. Thus, the smart harness may be configured to communicatively coordinate two or more aftermarket OBD devices with an existing OBD connector while minimizing data loss.

A smart harness may include an OBD connector configured to be releasably received by and selectively plugged into the ECU connector of the vehicle and two or more OBD connectors configured to releasably receive and be selectively plugged into by two or more OBD devices. The smart harness may be configured to direct data such as requests from the OBD devices to the ECU and responses from the ECU to the respective OBD devices associated with each request. Thus, the smart harness passes the requests from one or more OBD devices to the ECU and, upon receiving each response, the ECU may send each response to the respective OBD devices that requested the data thereby reducing data loss and confusion.

The smart harness may include one or more transceivers configured for use with a controller area network ("CAN") of a vehicle. The transceiver, also referred to as a controller area network transceiver ("CAN transceiver"), may be configured for use may include a protocol such as a serial communications protocol to efficiently support real-time or near real-time diagnostic information with respect to any portion of the vehicle, e.g., the electronics, sensors, engine, and vehicle body. An exemplary protocol may include a CAN specification, International Standards Organization (ISO) 11898 standard, or CAN Flexible Data ("CAN FD") specification.

The smart harness may be configured to be essentially transparent to the OBD devices, for example, by allowing the OBD devices to operate independently with respect to the ECU. For example, the smart harness may include a wired connection to interconnect the OBD devices and the ECU while minimizing electromagnetic interference ("EMI") between the OBD devices and from the numerous electrical systems of the vehicle. The smart harness may further include a processor and a memory configured to track requests and responses by generating a distribution record, e.g., as part of the memory, including a log of the requests and the corresponding responses.

As each request passes through the smart harness to the ECU, the smart harness may be configured to record, as part of the distribution record, which OBD connector sent the request and the associated diagnostic information of the request such as a diagnostic code including, for example, a mode and an on-board diagnostics Parameter ID ("PID"). When a response is returned from the ECU, the smart harness may compare the diagnostic information of the response, e.g., the mode and the PID, with the diagnostic information recorded as part of the distribution record, e.g., modes and PIDs from one or more requests. Based on matching diagnostic information between the response and the distribution record, the smart harness may route each response to one or more OBD devices associated with the request according to the distribution record. Thus, the smart harness may distribute responses from a vehicle communication bus to one or more devices not based on an address or identifier of the one or more devices.

The smart harness may comprise a primary harness connector that may be connected to the ECU, typically via an OBD connector, or via direct connection to a vehicle's communication bus. The smart harness may also include a first harness connector and a second harness connector that may be respectively connected to a first OBD device and a second OBD device. The primary harness connector may be configured to selectively plug into and be removable from a diagnostic connector of a vehicle. The first OBD device and the second OBD device may be selectively plugged into and be removable from the first and second harness connectors, respectively. One or all of the primary, first, and second harness connectors may further include a transceiver, such as a CAN transceiver, configured to communicatively connect with the ECU with the first OBD device and second OBD device. Thus, the smart harness is configured to communicatively connect the first and second OBD devices to a communication bus of the vehicle.

The smart harness may coordinate requests and responses between the first and second OBD devices and the ECU. The processor may be configured to receive a request from at least one of the first and second OBD devices, record at least a portion of the request as part of the distribution record, send the request to the ECU, receive a response from the ECU, compare the response with the distribution record, and send the response to at least one of the first and second OBD devices based on the distribution record. Thus, the smart harness may be configured to coordinate requests and responses between the ECU and first and second OBD devices.

FIG. 1 illustrates an exemplary system 100, for example, to coordinate requests and responses, e.g., associated with diagnostic information, between a vehicle and one or more OBD devices. System 100 may take many different forms and include multiple and/or alternate components and facilities. While an exemplary system 100 is shown in FIG. 1, the exemplary components illustrated in FIG. 1 are not intended to be limiting. Indeed, additional or alternative components and/or implementations may be used.

As illustrated in FIG. 1, the system 100 may include an ECU 101, an ECU gateway 102, an ECU/diagnostic connector 103, a smart harness 104, a device 113 (e.g., devices 113a-b), , and connections 117. The ECU 101 may include an ECU gateway 102. The smart harness 104 may include one or more harness connectors 106 (e.g., harness connectors 106a-c) and connections 117. The smart harness 104 (e.g., harness connector 106c) and devices 113 may include a processor 105 and a memory 107. The memory 107 may include a program 108. The smart harness 104 (e.g., harness connectors 106a-c) and devices 113 (e.g., devices 113a-b) may include one or more transceivers 109. The harness connector 106c may further include a user interface 111.

The diagnostic information may include any information associated with a portion of vehicle. The diagnostic information may be requested as part of a request of the device 113 and provided as part of a response of the ECU 101. The diagnostic information may include any information requested by the device 113 or provided by the ECU 101 in response to the request of the device 113. Exemplary diagnostic information may be associated with an Electronic Control Unit output ("ECU output") configured to provide diagnostic and reporting capabilities with respect to the vehicle. The diagnostic information may be utilized to provide any information regarding a component or a system of the vehicle.

The diagnostic information may include, for example, a mode and an on-board diagnostics Parameter ID (PID). The mode may indicate a grouping of related operations that may be performed by or associated with the ECU 101. The PID, in combination with the mode identifier, may indicate the type of diagnostic information that is requested as part of a request (e.g., from the device 113) or provided as part of a response (e.g., from the ECU 101). The diagnostic information may be interpreted or decoded using a diagnostic standard (e.g., SAE J1708, SAE 1578 and SAE J1979). The diagnostic information associated with one or more issues associated with a portion of the vehicle may also be referred to as diagnostic trouble codes. The diagnostic information may indicate a status or issues associated with any portion of the vehicle.

Exemplary modes may include, without limitation, show current data (e.g., a request for PIDs indicating real-time or near real-time data of a portion of a vehicle), show freeze frame data (e.g., a request for PIDs indicating data of a portion of a vehicle captured at predefined time), show stored diagnostic trouble codes (e.g., a request for PIDs associated with one or more vehicle issue), clear diagnostic trouble codes and stored values (e.g., a request to clear trouble codes), provide test results (e.g., a request for results from oxygen sensor monitoring or other component system monitoring), show pending diagnostic trouble codes (e.g., a request for PIDs pending a response from the ECU 101), control operation of on-board portion (e.g., a request to control a portion of the vehicle such as the ECU 101), request diagnostic information (e.g., a request for a vehicle identification number (VIN) or a calibration ID), and permanent diagnostic trouble codes (DTCs) (e.g., a request for PIDs of cleared diagnostic trouble codes). Thus, the modes indicate an operation type associated with the ECU 101 and may have one or more associated PIDs.

Exemplary PIDs may include, without limitation, an engine coolant temperature, a fuel pressure, an engine rotations per minute (RPM), a fuel level percentage, an outside air temperature, an intake air temperature, an engine oil temperature, an engine fuel rate, a mass air flow rate (MAF), an intake manifold absolute pressure (MAP), an exhaust pressure, a throttle position, a vehicle speed, or any diagnostic trouble code. Exemplary diagnostic trouble codes may be associated with, for example, a fuel, air metering, ignition, intake, exhaust, emission control, vehicle speed, idle control, computer output circuit, transmission, or sensor system of the vehicle. Accordingly, the PIDs may provide diagnostic information regarding the vehicle.

The ECU 101 may include any computer system (e.g., an embedded computer system) configured to control one or more electrical systems of a vehicle. The ECU 101 may include an ECU gateway 102. The ECU 101, e.g., using the ECU gateway 102, may be configured to receive a request from the ECU/diagnostic connector 103 in communication with the smart harness 104 and the device 113. In response to the request, the ECU 101 may send the response to the ECU gateway 102 connected to the ECU/diagnostic connector 103.

The ECU/diagnostic connector 103 may include any connector configured to receive the smart harness 104. ECU/diagnostic connector 103 may include any OBD connector of any diagnostic code standard, for example a SAE J1962 connector or SAE J1979 connector. An exemplary ECU/diagnostic connector 103 may include an assembly line diagnostic link (ALDL), on-board diagnostics (OBD-I, OBD-1.5, or OBD-II), European on-board diagnostics (EOBD or EOBD2), Japanese on-board diagnostics (JOBD), or Australian Design Rule (ADR 79/01 or 79/02). An exemplary ECU/diagnostic connector 103 may include a recess or a female connector (e.g., a female OBD-II connector) configured to receive a corresponding compatible harness connector 106c of the smart harness 104. Thus, ECU/diagnostic connector 103 communicatively connects the smart harness 104 and the ECU 101.

The smart harness 104 may include its own computing device configured to communicatively connect the ECU/diagnostic connector 103, e.g., using harness connector 106c, with one or more devices 113, e.g., using the harness connectors 106a-b. An exemplary smart harness 104 may have a Y-cable configuration, for example, including the harness connector 106c (e.g., a male OBD connector) and the harness connectors 106a-b (e.g., a female OBD connectors). The smart harness 104 may connect the harness connector 106c to the harness connectors 106a-b using connections 117.

The connection 117 may include any wired connection configured to minimize or cancel out EMI associated with the numerous wiring and electrical systems of the vehicle. The connection 117 may also be configured to transfer power from the ECU/diagnostic connector 103 to the devices 113, e.g., to power the devices 113. The connection 117 may any type of wiring that minimizes or cancels out EMI, for example, associated with a relatively harsh environment of a vehicle. An exemplary connection 117 may include any type of wiring in which two conductors of a single circuit are twisted together, e.g., a twisted pair cable. The connection 117 may also include any shielded cable, e.g., a shielded twisted pair cable. The connection 117 may any other type of wiring that provides an economically efficient solution for reducing EMI.

The smart harness 104 may be configured to be removably received or selectively plugged into the ECU/diagnostic connector 103 in a non-permanent manner by a consumer such as when acting as an "aftermarket" add-on. Thus, the smart harness 104 may be readily moved from vehicle to vehicle. The smart harness 104, e.g., using harness connector 106c, may physically connect (e.g., mate or pair) with ECU/diagnostic connector 103 to communicatively connect with the ECU 101. The smart harness 104 may be powered by ECU/diagnostic connector 103 or by a battery as part of the smart harness 104. An exemplary harness connector 106 may include an OBD connector. The smart harness 104, e.g., harness connector 106c, may include a protrusion or a male connector (e.g., a male OBD-II connector) configured to be removably received in, plugged into, and selectively removed from the ECU/diagnostic connector 103. Thus, the installation with respect to the vehicle is not permanent.

The smart harness 104, e.g., harness connectors 106, may be configured to removably receive or be selectively plugged into by one or more devices 113, e.g., using harness connectors 106a-b. The smart harness 104 may also be configured to communicate with one or more devices 113, e.g., using transceiver 109. The smart harness 104 may be configured to receive requests from one or more devices 113 to the ECU 101 and send responses from the ECU 101 to the respective devices 113 associated with the requests. The smart harness 104, e.g., harness connectors 106a-b, may include a receptacle or a female connector (e.g., a female OBD-II connector) configured to removably receive, be plugged into by, and be selectively removed from the devices 113a-b.

The device 113 may include a computing device configured to request, receive, or request and receive data associated with a vehicle, e.g., diagnostic information. Exemplary computing devices may include, without limitation, telematics devices, diagnostic reader devices, mobile devices, cellular phones, smart-phones, super-phones, tablet computers, next generation portable devices, mobile printers, hand-held computers, notebooks, laptops, desktops, or any other computing system and/or device. The device 113 may include a protrusion or a male connector (e.g., a male OBD-II connector) configured to be removably received in, plugged into, and selectively removed from the ECU/diagnostic connector 103 or the smart harness 104, e.g., using the harness connectors 106a-b. Accordingly, the installation with respect to the ECU/diagnostic connector 103 or smart harness 104 is not permanent.

The smart harness 104 may be configured to communicatively connect with multiple types of devices 113. An exemplary device 113 may be configured to utilize any location determination technology that enables the determination of location information associated with the device 113, for example, using a global positioning system (GPS), indoor positioning system, local positioning system, mobile phone tracking, or a combination thereof. An exemplary device 113 may include a telematics device configured to provide telematics services, for example, using location information and including, without limitation, vehicle tracking, usage-based insurance, automatic driving assistance, container tracking, cold storage tracking, fleet management, safety information (e.g., road hazard or weather notifications), emergency warning information (e.g., emergency vehicle notifications), and vehicle status (e.g., a notification of diagnostic information or vehicle issues). An exemplary device 113 may include a diagnostic reader device configured to request and receive real-time or near real-time diagnostic information associated an ECU of a vehicle (e.g., ECU 101). Thus, the smart harness 104 may be configured to communicatively connect with two or more devices 113 of a similar or different type.

The program 108, of the smart harness 104, may be loaded into the memory 107 and provide instructions to be executed by the processor 105. The smart harness 104, using the processor 105 to execute the instructions of the program 108, may be coordinate requests and responses between the ECU 101 and one or more devices 113. The smart harness 104, e.g., using the transceivers 109a-b, may be configured receive a request, e.g., from one or more devices 113. The smart harness 104, using program 108, may be further configured to store the request as part of the memory 107. The smart harness 104, e.g., using the transceiver 109a, may also be configured to send the request to the ECU 101 and receive a response from the ECU 101. The smart harness 104, e.g., using the processor 105, may be further configured to compare the received response from the ECU with one or more respective requests as part of the distribution record. The smart harness 104, e.g., using the transceivers 109a-b, may be configured to send the response, e.g., to one or more devices 113 associated with the request based on the distribution record. The smart harness 104, e.g., using the user interface 111 in communication with a display, may additionally be configured to display the response as part of the display.

The smart harness 104, using program 108, may be configured to track requests and responses according to a request identifier. A unique request identifier may be associated with each of harness connectors 106a-b or devices 113a-b. For example, a first connector identifier may be associated with requests received by the harness connector 106a or device 113a and a second connector identifier may be associated with requests received by the harness connector 106b or device 113b. Thus, the request identifier may be used to route responses from the ECU 101 to the harness connector 106 or device 113 associated with the request.

The smart harness 104, using program 108, may be configured to maintain a distribution record, e.g., as part of memory 107, associated with the requests of devices 113 and responses of ECU 101. The smart harness 104, using the processor 105, may be configured to generate and store the distribution record as part of the memory 107. An exemplary distribution record may include a log of requests and responses, e.g., using a table as part of memory 107. The distribution record may include which device 113 or harness connector 106 received the request and the diagnostic information associated with the request, e.g., the mode, the PID, and the request identifier. The distribution record may also include a request status, for example, indicating whether a request is pending (e.g., a response has not yet been received from the ECU 101) or completed (e.g., a response been received from the ECU 101). Thus, the smart harness 104 is configured to route requests and responses based on the distribution record.

For example, the smart harness 104 may receive (e.g., using transceiver 109) a request from device 113a, store (e.g., as part of memory 107) at least a portion of the request as part of the distribution record including, for example, the mode, PID, request status (e.g., pending), and a request identifier, as described in more detail below. After a response is generated based on the request, the smart harness 104 may receive (e.g., using the transceiver 109) the response from the ECU 101, store (e.g., as part of the memory 107) at least a portion of the response as part of the distribution record, compare (e.g., using the processor 105) the response to the distribution record, identify (e.g., using the processor) any requests having at least a matching mode and PID, send (e.g., using the transceiver 109) the response to the harness connector 106 or device 113 associated with the request identifier, and record the request status (e.g., completed) as part of the distribution record.

The smart harness 104 may include a messaging queue. The program 108 of smart harness 104 may be configured to cause the processor 105 to generate and operate the messaging queue. The messaging queue may be configured as a destination for all data, such as diagnostic information, to be routed including, for example, requests from one or more devices 113 and responses from the ECU 101. The messaging queue may include an incoming messaging queue configured to handle the receipt of requests from one or more devices 113 and responses from the ECU 101. The messaging queue may also include an outgoing messaging queue configured to handle the routing of requests to the ECU 101 and responses to one or more devices 113. Using the messaging queue, the program 108 may then cause the processor 105 to manage the routing of requests and responses between the ECU 101 and one or more devices 113.

The messaging queue of program 108 may maintain a processing order in which the incoming and outgoing diagnostic information is processed by the processor 105. Using the processing order, the messaging queue may be configured to queue and sequentially receive requests from one or more devices 113 and responses from the ECU 110 and, in addition, sequentially send requests to the ECU 101 and responses to one or more devices 113. The processing order may be based in part on a receipt order in which the requests and responses are received by the smart harness 104 (e.g., a first-in-first-out order). For example, a first request, received before a second request, may be processed (e.g., by processor 105) before the second request based on the receipt order. Thus, the messaging queue maintains the processing order of requests and responses.

The processing order may also be based in part on a predefined priority associated with a particular request identifier. The predefined priority may be assigned to at least one of harness connectors 106a and 106b associated with devices 113a and 113b, respectively. The predefined priority may be assigned using the program 108 displayed as part of a display connected to the user interface 111. Program 108 may include instructions that, for example, when executed by processor 105, implement a request priority hierarchy, which may be stored as part of memory 107, to determine an order to process requests. The request priority hierarchy may be downloaded or input via user interface 111, which may be running on a user device such as a smartphone that is communicatively coupled with smart harness 104. In an aspect, the request priority hierarchy may be based on certain mode/PID combinations being more important, thus needed more quickly, than other combinations. Accordingly, smart harness 104 would typically forward to the vehicle's communication bus a first request that has a higher priority before forwarding a second request that has a lower priority than the first if the first and second requests are received by the smart harness at substantially the same time (e.g., within a predetermined, selectable, overlap period).

In another aspect, at least one of a higher priority and a lower priority may be assigned to at least one of the harness connectors 106a and 106b. For example, the harness connector 106a may be assigned a lower priority or the harness connector 106b may be assigned a higher priority, or vice versa. If a first request is received by the harness connector 106a, e.g., assigned to a lower priority, and subsequently a second request is received by the harness connector 106b, e.g., assigned a higher priority, before the first request is read or processed by the processor 105, the second request may be read by the processor 105 and sent by the transceiver 109 to the ECU before the first request. Further, if a first response associated with the harness connector 106a, e.g., assigned to a lower priority, is received from the ECU and subsequently a second response associated with the harness connector 106b, e.g., assigned a higher priority, is received from the ECU before the first response is read or processed by the processor 105, the second response may be read by the processor 105 and sent to the harness connector 106b before the first response is sent to the harness connector 106a. Thus, the harness connector may prioritize the processing of requests between the devices 113 and the ECU based on a predefined priority assigned to at least one of harness connectors 106a and 106b.

The smart harness 104 may further be configured to send a multi-frame response, for example, to extend a wait time of one or more devices 113. The device 113 may have a predefined timeout period (e.g., approximately 100 milliseconds per data packet) defining a period of time from sending a first request in which the device 113 waits for a respective first response from the ECU 101 before the device 113 stops waiting and sends a second request to the ECU 101. The smart harness 104 may include a response timer configured to measure, using the processor 105, a response time defined by an amount of time between when a request is received from the device 113 and when a respective response from the ECU 101 is sent to the device 113 and compare, using the processor 105, the response time to a predefined response threshold, e.g., predefined with the program 108. To extend the wait time of the device 113, the smart harness 104 may be configured to generate a multi-frame response to the device 113 when the response time is near the response threshold, for example, by sending nominal data packets to the device 113 in advance of receiving the response from the ECU 101 and until the response is received from the ECU 101 and sent to the device 113. For example, the smart harness 104, using the transceiver 109, may send the nominal data packets in increments (e.g., of less than approximately 100 milliseconds) to extend the wait time of the device 113 until the respective response is received from the ECU 101 and sent to the device 113. As a result, the smart harness 104, using the processor 105, may delay the wait time of the device 113 by initiating the multi-frame response until the response is received from the ECU 101 and sent to the device 113.

The transceiver 109 may include any device configured to receive, send, or receive and send data using connections 117. An exemplary transceiver 109 (e.g., of harness connectors 106a-c) may include a CAN transceiver. The transceiver 109 may communicatively connect any devices of system 100, for example, ECU 101, ECU/diagnostic connector 103, smart harness 104, and devices 113. The transceiver 109 may receive, send, or receive and send data using any combination of hardware and software. For example, the smart harness 104 may include one transceiver configured to transfer data with respect to ECU 101, ECU/diagnostic connector 103, smart harness 104, and devices 113. Alternatively, the smart harness 104 may include a plurality of transceivers 109, e.g., as part of any or each of the harness connectors 106a-c, configured to transfer data with respect to ECU 101, ECU/diagnostic connector 103, smart harness 104, and devices 113. Thus, one or a plurality of transceivers 109 may be configured to transfer data between the ECU and devices 113.

The smart harness 104 may include a user interface 111 configured to present or display diagnostic information. The user interface 111 may include a mechanism to connect such things as a computer display or input device, support user interfaces, and/or communicate within the system 100. The user interface 111 may be configured for use with any device for presentation or receipt of information in visual or tactile form. Examples of a display may include, without limitation, cathode ray tube display, light-emitting diode display, electroluminescent display, touchscreen, electronic paper, plasma display panel, liquid crystal display, high-performance addressing display, thin-film transistor display, organic light-emitting diode display, surface-conduction electron-emitter display, laser TV, carbon nanotubes, quantum dot display, interferometric modulator display, and the like.

Any portion of system 100 (e.g., smart harness 104 and devices 113) may include a computing system and/or device that includes a processor 105 and a memory 107. Computing systems and/or devices generally include computer-executable instructions, where the instructions may be executable by one or more devices such as those listed below. Computer-executable instructions may be compiled or interpreted from computer programs created using a variety of programming languages and/or technologies, including, without limitation, and either alone or in combination, Java™, C, C++, Visual Basic, Java Script, Perl, etc. The system 100 (e.g., smart harness 104 and device 113) may take many different forms and include multiple and/or alternate components and facilities, as illustrated in the Figures further described below. While exemplary systems, devices, modules, and sub-modules are shown in the Figures, the exemplary components illustrated in the Figures are not intended to be limiting. Indeed, additional or alternative components and/or implementations may be used, and thus the above communication operation examples should not be construed as limiting.

In general, computing systems and/or devices (e.g., smart harness 104 and devices 113) may employ any of a number of computer operating systems, including, but by no means limited to, versions and/or varieties of the Microsoft Windows® operating system, the Unix operating system (e.g., the Solaris® operating system distributed by Oracle Corporation of Redwood Shores, Calif.), the AIX UNIX operating system distributed by International Business Machines of Armonk, N.Y., the Linux operating system, the Mac OS X and iOS operating systems distributed by Apple Inc. of Cupertino, Calif., the BlackBerry OS distributed by Research In Motion of Waterloo, Canada, and the Android operating system developed by the Open Handset Alliance.

Further, processors such as processor 105 receives instructions from memories (e.g., memory 107) and executes the instructions, thereby performing one or more processes, including one or more of the processes described herein. The processor 105 may be configured to perform operations with respect to diagnostic information as described herein. Such instructions, operations, and diagnostic information may be stored and transmitted using a variety of computer-readable mediums (e.g., memory 107). Processors such as processor 105 may include processes comprised from any hardware, software, or combination of hardware or software that carries out instructions of a computer programs by performing logical and arithmetical calculations, such as adding or subtracting two or more numbers, comparing numbers, or jumping to a different part of the instructions. For example, the processor 105 may be any one of, but not limited to single, dual, triple, or quad core processors (on one single chip), graphics processing units, visual processing units, and virtual processors.

The memory 107 may include, in general, any computer-readable medium (also referred to as a processor-readable medium) that may include any non-transitory (e.g., tangible) medium that participates in providing diagnostic information or instructions that may be read by a computer (e.g., by the processor 105 of the smart harness 104). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including radio waves, metal wire, fiber optics, and the like, including the wires that comprise a system bus coupled to a processor of a computer. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Figure 2:
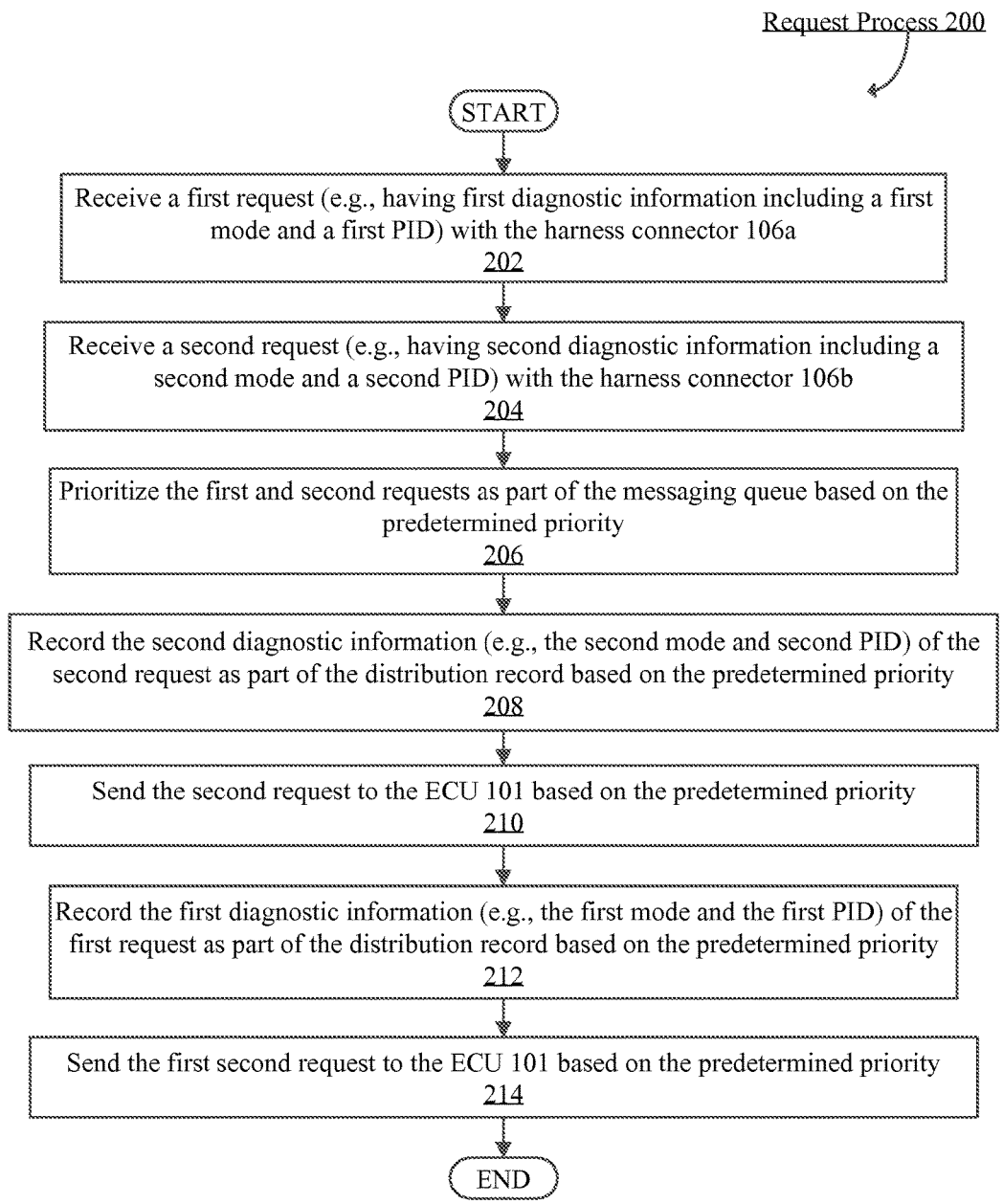
FIG. 2 illustrates an exemplary request process.

FIG. 2 illustrates an exemplary request process 200. Process 200 may take many different forms and include multiple and/or alternate components and facilities. While an exemplary process 200 is shown in FIG. 2, the exemplary components illustrated in FIG. 2 are not intended to be limiting. Indeed, additional or alternative components and/or implementations may be used.

At block 202, the smart harness 104 receives, e.g., using the transceiver 109a, a first request (e.g., having first diagnostic information including a first mode and a first PID) from the device 113a with the harness connector 106a.

At block 204, the smart harness 104 receives, e.g., using the transceiver 109b, a second request, e.g., having second diagnostic information including a second mode and a second PID, from the device 113b with the harness connector 106b.

At block 206, the smart harness 104 prioritizes, e.g., using the program 108, the first and second requests as part of the messaging queue, e.g., based on the predetermined priority assigned using the user interface 111, as described above. If the first request is associated with at least one of harness connector 106a and 106b having a higher priority, the first request may be recorded, and sent to the ECU 101 before the second request. Alternatively, if the second response is associated with at least one of harness connector 106a and 106b having a higher priority, the second request may be recorded and sent to the ECU 101 before the first request. If neither of the harness connectors 106a and 106b have a predetermined priority, the first and second requests may be processed according to the order in which they are received.

At block 208, the smart harness 104 records, e.g., using the processor 105, the second diagnostic information (e.g., the second mode and second PID) associated with the second request as part of the distribution record, e.g., as part of the memory 107. For purposes of this example, harness connector 106b has been assigned a higher priority, as described above.

At block 210, the smart harness 104 sends, e.g., using the transceiver 109c, the second request to the ECU 101 based on the predetermined priority.

At block 212, the smart harness 104 records, e.g., using the processor 105, the first diagnostic information (e.g., the first mode and first PID) associated with first request as part of the distribution record, e.g., as part of the memory 107. For purposes of this example, harness connector 106a has been assigned a lower priority, as described above.

At block 214, the smart harness 104 sends, e.g., using the transceiver 109c, the first request to the ECU 101 based on the predetermined priority. After block 214, the process 200 ends.

Figure 3:
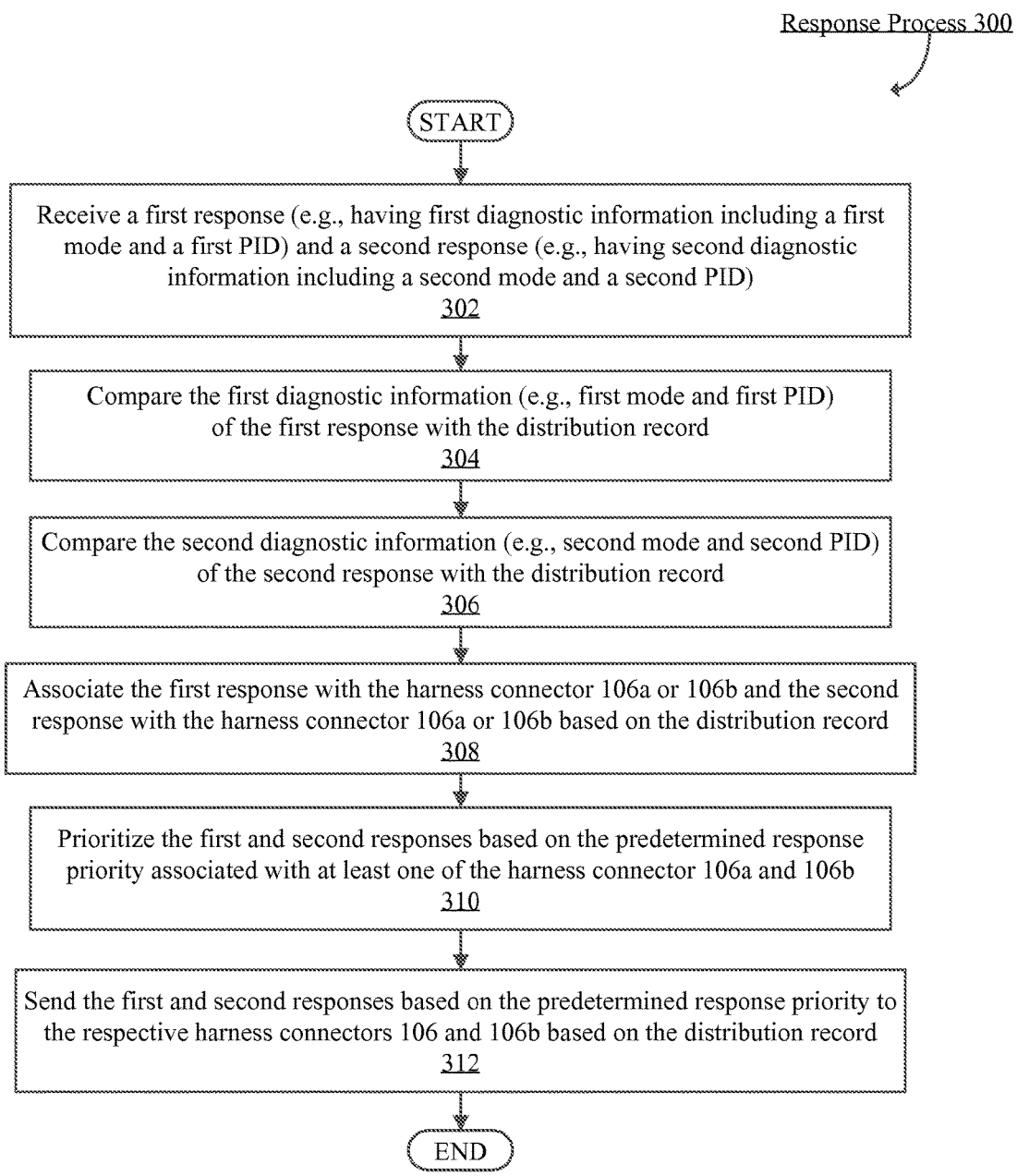
FIG. 3 illustrates an exemplary response process.

FIG. 3 illustrates an exemplary response process 300. Process 300 may take many different forms and include multiple and/or alternate components and facilities. While an exemplary process 300 is shown in FIG. 3, the exemplary components illustrated in FIG. 3 are not intended to be limiting. Indeed, additional or alternative components and/or implementations may be used.

At block 302, the smart harness 104 receives, e.g., using the transceiver 109c, a first response (e.g., having first diagnostic information including a first mode and a first PID) and a second response (e.g., having second diagnostic information including a second mode and a second PID) from the ECU 101.

At block 304, the smart harness 104 compares, e.g., using the processor 105, the first diagnostic information (e.g., the first mode and the first PID) of the first response to the distribution record, e.g., as part of the memory 107. For example, the first mode and first PID of the first response may be compared to the modes and PIDs of the requests as part of the distribution record, each of which may be associated with at least one of the harness connector 106a and harness connector 106b. If the first mode and first PID of the first response match a request of the distribution record associated with the harness connector 106a, the smart harness 104, e.g., using the processor 105, may associate or route the first response to the harness connector 106a based on the distribution record. If the first mode and first PID of the first response match a request of the distribution record associated with the harness connector 106b, the smart harness 104, e.g., using the processor 105, may associate or route the first response to the device 113b based on the distribution record.

At block 306, the smart harness 104 compares, e.g., using the processor 105, the second diagnostic information (e.g., the second mode and the second PID) of the second response to the distribution record, e.g., as part of the memory 107. For example, the second mode and second PID of the second response may be compared to the modes and PIDs of the requests as part of the distribution record, each of which may be associated with at least one of the harness connector 106a and harness connector 106b. If second mode and second PID of the second response match a request of the distribution record associated with the harness connector 106a, the smart harness 104, e.g., using the processor 105, may associate or route the second response to the harness connector 106a based on the distribution record. If second mode and second PID of the second response match a request of the distribution record associated with the harness connector 106b, the smart harness 104, e.g., using the processor 105, may associate or route the second response to the device 113b based on the distribution record.

At block 308, the smart harness 104 associates, e.g., using the processor 105, the first response with the harness connector 106a or 106b and the second response with the harness connector 106a or 106b based on the distribution record.

At block 310, the smart harness 104 may prioritize, e.g., using the processor 105 to execute instructions of the program 108, the first and second responses based on the predetermined priority associated with at least one of the harness connector 106a and 106b, e.g., based on a predetermined response priority hierarchy assigned using the user interface 111, as described above. A response priority may be the same as, or may differ from, a request priority associated with a given device or harness connector 106. If the first response is associated with at least one of harness connector 106a and 106b having a higher response priority, the first response may be processed and sent to the respective harness connector 106a or 106b before the second response. Alternatively, if the second response is associated with at least one of harness connector 106a and 106b having a higher response priority, the second response may be processed and sent to the respective harness connector 106a or 106b before the first response. If neither of the harness connectors 106a and 106b have a predetermined priority, the first and second responses may be processed according to the order in which they are received from the ECU.

At block 312, the smart harness 104 sends, e.g., using transceiver 109, the first and second responses based on the predetermined priority to the respective harness connectors 106a and 106b based on the distribution record. After block 312, the process 300 ends.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their broadest reasonable constructions and their ordinary meanings as understood by those knowledgeable in the technologies described herein unless an explicit indication to the contrary in made herein. In particular, use of the singular articles such as "a," "the," "said," etc. should be read to recite one or more of the indicated elements unless a claim recites an explicit limitation to the contrary.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A harness comprising:
   a male connector configured to connect to an Electronic Control Unit (ECU) of a vehicle;
   a first female connector configured to connect to a first On-Board Diagnostics (OBD) device;
   a second female connector configured to connect to a second OBD device,
      the ECU providing power to:
         the harness,
         the first OBD device via the harness, and
         the second OBD device via the harness, and
      the harness minimizing electromagnetic interference between an electrical system of the vehicle and the first OBD device and between the electrical system of the vehicle and the second OBD device;
   at least one transceiver configured to communicatively connect the ECU with each of the first OBD device and the second OBD device; and
   a processor to:
      receive, via the at least one transceiver, a first request from the first OBD device,
         the first request requesting first diagnostic information of the vehicle,
         the first request being associated with a first connector identifier,
            the first connector identifier being a unique first request identifier associated with the first OBD device;
      store, in a memory and with a distribution record, the first diagnostic information requested by the first request, and information indicating that the first request is received from the first OBD device;
      receive, via the at least one transceiver, a second request from the second OBD device,
         the second request requesting second diagnostic information of the vehicle,
         the second request being associated with a second connector identifier,
            the second connector identifier being a unique second request identifier associated with the second OBD device;
      store, in the memory and with the distribution record, the second diagnostic information requested by the second request, and information indicating that the second request is received from the second OBD device;
      receive an input provided via a user interface of the harness,
         the input being associated with a predefined priority hierarchy,
            the predefined priority hierarchy being based on combinations of mode and on-board diagnostic parameters;
      prioritize each of the first request and the second request based on the predefined priority hierarchy;
      send, via the at least one transceiver and based on the predefined priority hierarchy, the first request and the second request to the ECU;
      receive, via the at least one transceiver, a first response and a second response from the ECU;
      compare the first response, the second response, and the distribution record,
         the first response including the first diagnostic information of the vehicle, and
         the second response including the second diagnostic information of the vehicle;
      send, via the at least one transceiver, the first response to the first OBD device when comparing the first response and the distribution record indicates that the first response is associated with the first OBD device,
         the at least one transceiver being configured to send a multi-frame response for extending a wait time of the first OBD device,
            the multi-frame response including sending nominal data packets in increments; and
      send, via the at least one transceiver, the second response to the second OBD device when comparing the second response and the distribution record indicates that the second response is associated with the second OBD device,
         at least one of the first diagnostic information or the second diagnostic information being displayed via the user interface; and
   a response timer,
      the response timer being configured to:
         measure a response time between when the first request is received from the first OBD device and when the first response is sent to the ECU, and
         compare the response time to a predefined response threshold,
   where the processor is further to:

generate a multi-frame response when the response time does not meet the threshold,
the multi-frame response including sending nominal data packets to the first OBD device until the first response is received from the ECU and sent to the first OBD device.

2. The harness of claim 1, where the first request has a higher priority than the second request based on the predefined priority hierarchy.

3. The harness of claim 1, where the processor is further to:
route the first response to the first OBD device based in part on the first unique request identifier; and
route the second response to the second OBD device based in part on the second unique request identifier.

4. The harness of claim 1, where the processor is further to:
store, in the memory, a first request status, associated with the first request, as part of the distribution record; and
store, in the memory, a second request status, associated with the second request, as part of the distribution record.

5. The harness of claim 1, wherein the distribution record includes at least one of a mode or an on-board diagnostics parameter identifier associated with the first request or the second request.

6. The harness of claim 1, wherein the first OBD device includes a telematics device and the second OBD device includes a diagnostic reader device.

7. The harness of claim 1, where the mode indicates one or more operations associated with the ECU that are to be performed,
the one or more operations including:
causing current data to be displayed,
causing freeze frame data to be displayed,
causing stored diagnostic trouble codes to be displayed,
clearing diagnostic trouble codes and stored values,
providing test results,
causing pending diagnostic trouble codes to be displayed,
controlling operation of on-board portion, or
requesting diagnostic information.

8. A non-transitory computer-readable medium storing instructions, the instructions comprising:
one or more instructions that, when executed by a processor of a harness, cause the processor to:
receive power from an electronic control unit (ECU) of a vehicle,
the ECU providing power to:
the harness,
a first On-Board Diagnostics (OBD) device via the harness, and
a second OBD device via the harness, and
the harness minimizing electromagnetic interference between an electrical system of the vehicle and the first OBD device and between the electrical system of the vehicle and the second OBD device;
receive a first request from the first OBD device,
the first request requesting first diagnostic information of the vehicle,
the first request being associated with a first connector identifier,
the first connector identifier being a first unique request identifier associated with the first OBD device;
store, in a memory and with a distribution record, the first diagnostic information requested by the first request, and information indicating that the first request is received from the first OBD device;
receive a second request from the second OBD device,
the second request requesting second diagnostic information of the vehicle,
the second request being associated with a second connector identifier,
the second connector identifier being a second unique request identifier associated with the second OBD device;
store, in the memory and with the distribution record, the second diagnostic information requested by the second request, and information indicating that the second request is received from the second OBD device;
receive an input provided via a user interface of the harness,
the input being associated with a predefined priority hierarchy,
the predefined priority hierarchy being based on combinations of mode and on-board diagnostic parameters;
prioritize each of the first request and the second request based on the predefined priority hierarchy;
send, based on the predefined priority hierarchy, the first request and the second request to the ECU;
receive a first response and a second response from the ECU;
compare the first response, the second response, and the distribution record,
the first response including the first diagnostic information of the vehicle, and
the second response including the second diagnostic information of the vehicle;
send the first response to the first OBD device when comparing the first response and the distribution record indicates that the first response is associated with the first OBD device,
send a multi-frame response for extending a wait time of the first OBD device,
the multi-frame response including sending nominal data packets in increments; and
send the second response to the second OBD device when comparing the second response and the distribution record indicates that the second response is associated with the second OBD device,
at least one of the first diagnostic information or the second diagnostic information being displayed via the user interface;
measure a response time between when the first request is received from the first OBD device and when the first response is sent to the ECU,
compare the response time to a predefined response threshold; and
generate a multi-frame response when the response time does not meet the threshold,
the multi-frame response including sending nominal data packets to the first OBD device until the first response is received from the ECU and sent to the first OBD device.

9. The non-transitory computer-readable medium of claim 8, where the first request has a higher priority than the second request based on the predefined priority hierarchy.

10. The non-transitory computer-readable medium of claim 8, where the instructions further comprise:
one or more instructions that, when executed by the processor, cause the processor to:

route one of the first response or the second response to one of the first OBD device or the second OBD device based in part on one of the first unique request identifier or the second unique request identifier, respectively.

11. The non-transitory computer-readable medium of claim 8, where the instructions further comprise:
one or more instructions that, when executed by the processor, cause the processor to:
store a request status, associated with one of the first request or the second request, as part of the distribution record.

12. The non-transitory computer-readable medium of claim 8, wherein the distribution record includes at least one of a mode or an on-board diagnostics parameter identifier associated with the first request or the second request.

13. The non-transitory computer-readable medium of claim 12, where the on-board diagnostics parameter identifier relates to at least one of:
an engine coolant temperature,
a fuel pressure,
engine rotations per minute (RPM),
a fuel level percentage,
an outside air temperature,
an intake air temperature,
an engine oil temperature,
an engine fuel rate,
a mass air flow rate (MAF),
an intake manifold absolute pressure (MAP),
an exhaust pressure,
a throttle position,
a vehicle speed, or
a diagnostic trouble code.

14. The non-transitory computer-readable medium of claim 8, wherein the first OBD device includes a telematics device and the second OBD device includes a diagnostic reader device.

15. A method comprising:
receiving, by a harness, power from an electronic control unit (ECU) of a vehicle,
the ECU providing power to:
a first On-Board Diagnostics (OBD) device via the harness, and
a second OBD device via the harness, and
the harness minimizing electromagnetic interference between an electrical system of the vehicle and the first OBD device and between the electrical system of the vehicle and the second OBD device;
receiving, by the harness, a first request from the first OBD device,
the first request requesting first diagnostic information of the vehicle
the first request being associated with a first connector identifier,
the first connector identifier being a first unique request identifier associated with the first OBD device;
storing, by the harness, in a memory, and with a distribution record, the first diagnostic information requested by the first request, and information indicating that the first request is received from the first OBD device;
receiving, by the harness, a second request from the second OBD device,
the second request requesting second diagnostic information of the vehicle,
the second request being associated with a second connector identifier,
the second connector identifier being a second unique request identifier associated with the second OBD device;
storing, by the harness, in the memory, and with the distribution record, the second diagnostic information requested by the second request, and information indicating that the second request is received from the second OBD device;
receiving, by the harness, an input provided via a user interface of the harness,
the input being associated with a predefined priority hierarchy,
the predefined priority hierarchy being based on combinations of mode and on-board diagnostic parameters;
prioritizing, by the harness, each of the first request and the second request based on the predefined priority hierarchy;
sending, by the harness and based on the predefined priority hierarchy, the first request and second request to the ECU;
receiving, by the harness, a first response and a second response from the ECU;
comparing, by the harness, the first response, the second response, and the distribution record,
the first response including the first diagnostic information of the vehicle, and
the second response including the second diagnostic information of the vehicle;
sending, by the harness, the first response to the first OBD device when comparing the first response and the distribution record indicates that the first response is associated with the first OBD device,
sending, by the harness, a multi-frame response for extending a wait time of the first OBD device,
the multi-frame response including sending nominal data packets in increments; and
sending, by the harness, the second response to the second OBD device when comparing the second response and the distribution record indicates that the second response is associated with the second OBD device,
at least one of the first diagnostic information or the second diagnostic information being displayed via the user interface;
measuring, by the harness, a response time between when the first request is received from the first OBD device and when the first response is sent to the ECU;
comparing, by the harness, the response time to a predefined response threshold; and
generating, by the harness, a multi-frame response when the response time does not meet the threshold,
the multi-frame response including sending nominal data packets to the first OBD device until the first response is received from the ECU and sent to the first OBD device.

16. The method of claim 15, where the second request has a higher priority than the first request based on the predefined priority hierarchy.

17. The method of claim 15, further comprising:
routing the first response or the second response to one of the first OBD device or the second OBD device based in part on the first unique request identifier or the second unique request identifier, respectively.

18. The method of claim 15, further comprising:
storing a request status, associated with one of the first request or the second request, as part of the distribution record.

19. The method of claim 15, wherein the distribution record includes at least one of a mode or an on-board diagnostics parameter identifier associated with the first request or the second request.

20. The method of claim 19, where the on-board diagnostics parameter identifier relates to at least one of:
- an engine coolant temperature,
- a fuel pressure,
- engine rotations per minute (RPM),
- a fuel level percentage,
- an outside air temperature,
- an intake air temperature,
- an engine oil temperature,
- an engine fuel rate,
- a mass air flow rate (MAF),
- an intake manifold absolute pressure (MAP),
- an exhaust pressure,
- a throttle position,
- a vehicle speed, or
- a diagnostic trouble code.

* * * * *